United States Patent [19]
Knies et al.

[11] Patent Number: 5,721,300
[45] Date of Patent: Feb. 24, 1998

[54] SILICONE RUBBERS OF IMPROVED GREEN STRENGTH AND LOW COMPRESSION SET

[75] Inventors: Wolfgang Knies, Burghausen; Werner Guske, Inn, both of Germany

[73] Assignee: Wacker-Chemie GmbH, Munich, Germany

[21] Appl. No.: 796,461

[22] Filed: Feb. 10, 1997

[30] Foreign Application Priority Data

Apr. 11, 1996 [DE] Germany ................ 196 14 343.8

[51] Int. Cl.⁶ .................................................. C08K 3/28
[52] U.S. Cl. .................. 524/200; 524/724; 524/796; 524/861; 524/866; 528/15; 528/31; 528/32
[58] Field of Search ........................... 524/200, 724, 524/796, 861, 866; 528/15, 31, 32

[56] References Cited

U.S. PATENT DOCUMENTS 2,803,619  8/1957  Dickmann .
4,705,826  11/1987  Weber et al. .................... 524/860

FOREIGN PATENT DOCUMENTS 0210402  2/1987  European Pat. Off. .
0731131  9/1996  European Pat. Off. .
1642205  10/1970  Germany .

OTHER PUBLICATIONS

Chemical Abstracts, vol. 86, No. 22, May 30, 1977, Abstract No. 156812.

Derwent Abstract AN 73–02733U [03] for DE 1642205.

*Primary Examiner*—Margaret W. Glass
*Attorney, Agent, or Firm*—Martin Connaughton

[57] ABSTRACT

Polyorganosiloxane rubber compositions which cure to elastomers under the influence of heat comprise 0.01 to 1 part by weight of ammonium, alkali metal or alkaline earth metal carbamate. The green strength of the rubber compositions is increased by the addition of carbamate. At the same time, the compression set of the vulcanized rubbers are reduced.

8 Claims, No Drawings

SILICONE RUBBERS OF IMPROVED GREEN STRENGTH AND LOW COMPRESSION SET

BACKGROUND OF THE INVENTION

It is known that polytetrafluoroethylene powders, by themselves, or in combination with other substances or active fillers, can be used as additives for improving the green strength.

Polytetrafluoroethylene by itself, or as a mixture with other compounds such as boric acid, acts like a reinforcing filler and in this way increases the green strength of silicone rubbers. However, rubber-like properties are established, which manifest themselves in the fact that mill sheets change their shape in the direction of the non-rolled shape after a short storage time. The sheets shrink and become thicker. This is undesirable, since the blank no longer has the required shape and the compression molds are over-filled in some part regions and under-filled in other regions.

Boric acid by itself or in combination with polytetrafluoroethylene leads to after-vulcanization. This increases the compression set of the vulcanized material, a property which should be low for seals.

In U.S. Pat. No. 2,803,619, for example, the compression set is reduced by increasing the crosslinking density by increased addition of vinyl groups.

Active fillers, such as silicic acids of high surface area, increases the green strength, but also increases the hardness of the silicone rubber vulcanized materials.

BRIEF SUMMARY OF THE INVENTION

The present invention relates to carbamate-containing polyorganosiloxane rubber compositions which cure to elastomers under the influence of heat, and to a process for their preparation.

Silicone rubber compositions which cure to elastomers under the influence of heat after addition of substances which promote crosslinking are mixed with the substances which promote crosslinking and optionally, other additions, such as pigment paste, before the vulcanization. During this operation, the silicone rubber compositions are shaped to a sheet having a desired thickness, which is called a mill sheet. This sheet is cut or stamped to the required size and laid in a compression mold, or cut into tapes and introduced into an extruder or injection molding machine. The shaped articles thus produced are then cured to elastomers under the influence of heat.

The mill sheet should have a high strength, so that the shape and thickness of the shaped articles produced changes as little as possible during its working. If the mill sheet has a high strength, the reproducibility of the vulcanized components produced is good. If the strength is low, the mill sheet has a low plasticity. This manifests itself in slow diffluence, like a piece of asphalt shows slow diffluence. Furthermore, a mill sheet having lower strength adheres more firmly to the rolls and to a substrate. When peeled off, the sheet is easily deformed.

DETAILED DESCRIPTION OF THE INVENTION

The present invention is based on increasing the green strength of rubber compositions which cure to elastomers under the influence of heat after addition of substances which promote crosslinking, without having to accept a deterioration in other properties of the composition, in particular the plasticity and the adhesion of the mill sheet to a substrate and the compression set of the vulcanized material.

The present invention relates to polyorganosiloxane rubber compositions which cure to elastomers under the influence of heat and comprise (A) 100 parts by weight of a polyorganosiloxane of the formula

$$R^1_x R_{3-x} SiO(SiR_2O)_m(SiRR^1O)_n SiR_{3-x}R^1_x \quad (I)$$

in which

R is an identical or different monohydric hydrocarbon radical having 1 to 18 carbon atoms per radical and optionally substituted by a halogen atom or a cyano group, $R^1$ is an identical or different monovalent ethylenically unsaturated hydrocarbon radical having 2 to 6 carbon atoms per radical, m is an integer from 100 to 20,000 n is 0 or an integer from 1 to 200 and x is 0 or 1, (B) 20 to 200 parts by weight of filler, (C) substances which promote crosslinking and (D) 0.01 to 1 part by weight of ammonium, alkali metal or alkaline earth metal carbamate.

The sum of n+x for any given polyorganosiloxane comprised of formula (I) must be at least 1.

The green strength of the silicone rubber compositions is increased by the addition of carbamate (D). At the same time, the compression set of the vulcanized rubbers is also reduced.

The polyorganosiloxane (A) has a viscosity of $0.1 \times 10^6$ to $100 \times 10^6$ mPa·s at 25° C., preferably $1 \times 10^6$ to $20 \times 10^6$ mPa·s at 25° C.

Examples of radicals R are alkyl radicals, such as the methyl, ethyl, n-propyl, iso-propyl, n-butyl, iso-butyl, tert-butyl, n-pentyl, iso-pentyl, neo-pentyl and tert-pentyl radical; hexyl radicals, such as the n-hexyl radical; heptyl radicals, such as the n-heptyl radical; octyl radicals, such as the n-octyl radical and iso-octyl radicals, such as the 2,2,4-trimethylpentyl radical; nonyl radicals, such as the n-nonyl radical; decyl radicals, such as the n-decyl radical; dodecyl radicals, such as the n-dodecyl radical; and octadecyl radicals, such as the n-octadecyl radical; alkenyl radicals, such as the vinyl and the allyl radical; cycloalkyl radicals, such as cyclopentyl, cyclohexyl and cycloheptyl radicals and methylcyclohexyl radicals; aryl radicals, such as the phenyl, naphthyl and anthryl and phenanthryl radical; alkaryl radicals, such as o-, m- and p-tolyl radicals, xylyl radicals and ethylphenyl radicals; and aralkyl radicals, such as the benzyl radical and the α- and the β-phenylethyl radical. Preferred examples of the radical R are $C_{1-8}$-alkyl radicals, in particular the methyl radical and the phenyl radical.

Examples of substituted radicals R am cyanoalkyl radicals, such as the β-cyanoethyl radical, and halogenareal hydrocarbon radicals, for example halogenoalkyl radicals, such as the 3,3,3-trifluoro-n-propyl radical, the 2,2,2,2',2', 2'-hexafluoroisopropyl radical and the hexafluoroisopropyl radical, and halogenoaryl radicals, such as the o-, m- and p-chlorophenyl radical. Preferred halogen are fluorine and chlorine.

In addition to the diorganosiloxane units ($SiR_2O$), other siloxane units can also be present within or along the siloxane chains of formula (I). Examples of other such siloxane units, which are usually present only as impurities, are those of the formulae $RSiO_{3/2}$, $R_3SiO_{1/2}$ and $SiO_{4/2}$, in which R has the meaning given above for this radical.

However, the amount of other siloxane units such as diorganosiloxane units is preferably not more than 5 mole percent, in particular not more than 1 mole percent, based on the weight of polyorganosiloxane (A).

Examples of radicals $R^1$ are alkenyl radicals, such as the vinyl radical, allyl radical and cyclohexenyl radical. The vinyl radical is preferred.

Preferably, x has the value 1 and, n has a value from 10 to 100, i.e. the vinyl radicals are preferably in the terminal units and in the chain.

It is possible to use one type of polyorganosiloxane (A), or a mixture of at least two different types of polyorganosiloxane (A).

Examples of fillers (B) are non-reinforcing fillers having a specific surface area (BET) of up to 50 m²/g, such as quartz, diatomaceous earth, calcium silicate, zirconium silicate, zeolites, metal oxide powders, such as aluminum oxide, titanium oxide, iron oxide or zinc oxide or mixed oxides thereof, barium sulfate, calcium carbonate, gypsum and glass powder; and reinforcing fillers, having a specific surface area (BET) of more than 50 m²/g, such as silicon dioxide having a specific surface area (BET) of at least 50 m²/g, such as pyrogenically prepared silicic acid, precipitated silicic acid, carbon black, such as furnace and acetylene black, and silicon/aluminum mixed oxides of high BET surface area.

The fillers (B) can be hydrophobized by treatment with organosilanes or -siloxanes or by etherification of hydroxyl groups to alkoxy groups. It is possible to use one type of filler (B), or a mixture of at least two fillers (B).

Pyrogenically prepared silicic acid and precipitated silicic acid having a specific surface area (BET) of at least 50 m²/g, preferably at least 100 m²/g are used.

Filler (B) is preferably used in amounts of 20 to 100 parts by weight per 100 parts by weight of polyorganosiloxane (A).

The substances (C) which promote crosslinking, can be crosslinking agents (C1) which form free radicals, organopolysiloxanes (C2) which contain Si-bonded hydrogen atoms, or transition metal hydrosilylation catalysts (C3). If the polyorganosiloxane rubber compositions cure to elastomers under the influence of heat by hydrosilylation, the compositions comprise both organopolysiloxanes (C2) containing Si-bonded hydrogen atoms and transition meal hydrosilylation catalysts (C3).

Crosslinking agents (C1) which form free radicals are peroxides, preferably organic peroxides. Examples of such organic peroxides are acyl peroxides, such as dibenzoyl peroxide, bis-(4-chlorobenzoyl) peroxide and bis-(2,4-dichlorobenzoyl) peroxide; alkyl peroxides and aryl peroxides, such as dimethyl peroxide, di-tert-butyl peroxide and dicumyl peroxide; perketals, such as 2,5-bis-(tert-butylperoxy)-2,5-dimethylhexane; and peresters, such as diacetyl peroxydicarbonate and tert-butyl perbenzoate.

Crosslinking agents (C1) which form free radicals are used in amounts of 0.1 to 5 parts by weight, preferably 0.2 to 2.0 parts by weight, per 100 parts by weight of polyorganosiloxane (A).

Polyorganosiloxanes (C2) which contain Si-bonded hydrogen atoms can be used as crosslinking agents. The polyorganosiloxanes (C2) can be linear, cyclic or branched. The polyorganosiloxanes (C2) preferably contain at least 3 Si-bonded hydrogen atoms.

Polyorganosiloxanes (C2) which are used are polyorganosiloxanes of the formula

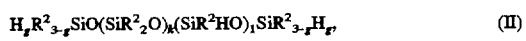  (II)

in which $R^2$ has the meanings of R, g is 0 or 1 and k and l each are 0 or are an integer from 1 to 100, with the proviso that the sum of g+k+l for any given polyorganosiloxane (C2) must be at least 2.

Examples and preferred examples of the radicals $R^2$ are given above in the examples of the radicals. Preferably, the radicals $R^2$ are saturated alkyl radicals or phenyl radicals.

Preferably k and l are each the value 0 or an integer from 1 to 50. The sum of k and l is a value from 1 to 50, preferably from 1 to 20.

Examples of polyorganosiloxanes (C2) are copolymers of dimethylhydridosiloxane, methylhydridosiloxane, dimethylsiloxane and trimethylsiloxane units, copolymers of trimethylsiloxane, dimethylhydridosiloxane and methylhydridosiloxane units, copolymers of trimethylsiloxane, dimethylsiloxane and methylhydridosiloxane units, copolymers of methylhydridosiloxane and trimethylsiloxane units, co-polymers of methylhydridosiloxane, diphenylsiloxane and trimethylsiloxane units, copolymers of methylhydridosiloxane, dimethylhydridosiloxane and diphenylsiloxane units, copolymers of methylhydridosiloxane, phenylmethylsiloxane, trimethylsiloxane and/or dimethylhydridosiloxane units, copolymers of methylhydridosiloxane, dimethylsiloxane, diphenylsiloxane, trimethylsiloxane and/or dimethylhydridosiloxane units, and copolymers of dimethylhydridosiloxane, trimethylsiloxane, phenylhydridosiloxane, dimethylsiloxane and/or phenylmethylsiloxane units.

The polyorganosiloxane (C2) is used in amounts of 0.5 to 6, preferably 1 to 3, more preferably 1.5 to 2.5, gram atoms of Si-bonded hydrogen per mole of ethylenically unsaturated bond in the radicals $R^1$ of the polyorganosiloxane (A).

The catalysts used in silicone rubber compositions which crosslink by addition can be used as the transition metal hydrosilylation catalyst (C3). These include the elements and compounds of platinum, rhodium, palladium, ruthenium and iridium, preferably platinum. Optionally, the transition metals can be fixed to finely divided support materials, such as active charcoal, metal oxides, such as aluminum oxide, or pyrogenically prepared silicon dioxide.

Platinum and platinum compounds are used as the hydrosilylation catalyst (C3). Those platinum compounds which are soluble in polyorganosiloxanes are more preferred. Soluble platinum compounds which can be used are the platinum-olefin complexes of the formulae $(PtCl_2 \cdot olefin)_2$ and $H(PtCl_3 \cdot olefin)$, alkenes having 2 to 8 carbon atoms, such as ethylene, propylene and isomers of butene and octene, or cycloalkenes having 5 to 7 carbon atoms, such as cyclopentene, cyclohexene and cycloheptene being used. Other soluble platinum catalysts are the platinum-cyclopropane complex of the formula $(PtCl_2 \cdot C_3H_6)_2$, the reaction products of hexachloroplatinic acid with alcohols, ethers and aldehydes or mixtures thereof, or the reaction product of hexachloroplatinic acid with methylvinylcyclotetrasiloxane in the presence of sodium bicarbonate in ethanolic solution. Complexes of platinum with vinylsiloxanes, such as sym-divinyltetramethyldisiloxane, are preferred.

The transition metal hydrosilylation catalysts (C3) are used in amounts of at least $10^{-4}$, preferably $10^{-3}$ parts by weight, to not more than $10^{-1}$, in particular not more than $10^{-2}$ parts by weight, calculated as the transition metal per 100 parts by weight of polyorganosiloxane (A).

The carbamate (D) is a salt with the anion $H_2NCOO$. Of the alkali metal carbamates, sodium carbamate and potassium carbamate, and of the alkaline earth metal carbamates, magnesium carbamate and calcium carbamate are preferred. Ammonium carbamate is preferred. The carbamate (D) can be added either as the pure substance or as a solution in water. Addition as the pure substance is preferred. Amounts below 0.01 part by weight do not produce the desired effect, while amounts above 1 part by weight lead to disintegration of the rubber mixture into many small particles in the mixer, which can be converted back into a compact composition only with increased effort. Amounts of at least 0.1 part by weight and not more than 0.5, preferably not more than 0.4 parts by weight per 100 parts by weight of polyorganosiloxane (A), are added.

The polyorganosiloxane rubber compositions can also comprise low-viscosity organosilicon compounds (E) as anti-structuring agent, The organosilicon compounds (E) have the formula

  (III)

in which

R$^3$ is a hydrogen atom or a monovalent hydrocarbon radical having 1 to 18 carbon atoms per radical, which is optionally interrupted by an ether oxygen atom, R$^4$ has the meaning of R and P is 0 or an integer from 1 to 50.

The organosilicon compound (E) has a viscosity of 10 to 100 mPa·s at 25° C., preferably 30 to 60 mPa·s at 25° C.

The organosilicon compound (E) is used in amounts of 0 to 30 parts by weight, preferably 0.5 to 20 parts by weight, more preferably 1 to 15 parts by weight per 100 parts by weight of polyorganosiloxane (A).

Examples of radicals R$^3$ are alkyl radicals, such as the methyl, ethyl, n-propyl, iso-propyl, 1-n-butyl, 2-n-butyl, iso-butyl and tert-butyl radical. The methyl and ethyl radical are preferred. Examples of radicals R$^3$ which are substituted by an ether oxygen atom are the methoxyethyl and ethoxyethyl radical.

Examples and preferred examples of radicals R$^4$ are listed above for the radicals R.

α,ω-Dihydroxydimethylpolysiloxanes having a viscosity of 30 to 60 mPa·s at 25° C. are preferred as the organosilicon compound (E).

In addition to components (A) to (D) and, optionally, (E), the polyorganosiloxane rubber compositions can contain conventional substances (F). Examples of such substances (F) are colored pigments, heat stabilizers, additives for reducing flammability and additives for improving resistance to oils.

Components (A) to (D) and, optionally (E) and (F) can be mixed in any desired sequence and the mixture can be subjected to heat treatment and, optionally degassing. The substances (C) which promote crosslinking are added only after the heat treatment, In a preferred embodiment, components (A), (B) and (D) are mixed and the mixture is then subjected to heat treatment, The plasticity of the mill hide is then higher and the adhesion to a substrate is lower than if the carbamate (D) is added after heat treatment or no heat treatment is carried out, Heating is carried out at 100° to 400° C., preferably at 110° to 250° C. The duration of the heating is 15 minutes to 10 hours, preferably 2 to 4 hours, at 140° to 180° C. During the heating, a slight reduced pressure can be applied in order to remove volatile impurities.

Mixing can be carried out in internal mixers, such as sigma kneaders, kneaders with plungers, for example of the Banbury type, continuous or discontinuous roll mills and single-screw or twin-screw extruders.

EXAMPLE 1

100 parts by weight of a dimethylpolysiloxane which has terminal vinyldimethylsiloxane units and about 0.2 mole % of vinylmethylsiloxane units and a viscosity of about 10$^6$ mPa·s at 25° C., 50 parts by weight of a precipitated silicic acid having a BET surface area of about 120 m$^2$/g, 2 parts by weight of an α,ω-dihydroxydimethylpolysiloxane having a viscosity of about 50 mPa·s at 25° C. and 0.1 part by weight of ammonium carbamate were mixed and the mixture was heated at about 150° C. for about 2 hours. After cooling, 0.7% by weight of dicumyl peroxide, based on the weight of the composition, was added to the resulting mixture and the mixture was kneaded on a roll mill and shaped to a mill sheet.

The green strength was evaluated as follows: a mill sheet 2 cm thick and about 10 cm wide and 50 cm long was placed on a glass plate. After storage for about 6 hours, the change in length of the mill sheet was measured and the force with which the sheet could be peeled off from the substrate was evaluated. The measurement values have the following meanings:

+ somewhat smaller force necessary than usual;

++ significantly smaller force necessary than usual;

+++ much smaller force required than usual.

Sheets having a thickness of 2 and 6 mm were produced from the mill sheet by vulcanization at 165° C. over a period of 15 minutes. The sheets were then conditioned at 200° C. for 4 hours.

The hardness, tear strength, elongation at break and tear propagation resistance were determined in accordance with JIS C2123, the rebound resilience was determined in accordance with DIN 53512 and the compression set was determined in accordance with DIN 53517 over 22 hours at 175° C. The Williams plasticity was determined for 3 minutes. The values measured are shown in the following table under A.

Another mixture B was prepared as above, with the difference that the ammonium carbamate was added only after cooling. In comparison 1, no ammonium carbamate was added. As comparison 2, a mixture was prepared as in A, into which 0.2 part by weight of polytetrafluoroethylene powder had been incorporated instead of ammonium carbamate.

|  | Mixture A | Mixture B | Comparison 1 | Comparison 2 |
| --- | --- | --- | --- | --- |
| Rubber |  |  |  |  |
| Change in length (%) | 3 | 2 | 3 | 10 |
| Green strength | +++ | ++ | standard | +++ |
| Williams plasticity | 265 | 232 | 194 | 243 |
| Vulcanized material |  |  |  |  |
| Hardness (JIS A) | 50 | 51 | 50 | 49 |
| Tear strength (kg/cm$^2$) | 97 | 98 | 100 | 88 |
| Rebound resilience (%) | 78 | 76 | 71 | 61 |
| Compression set (%) | 8 | 9 | 14 | 15 |

The comparison shows that the additive known to date for improving the green strength has the disadvantage of a marked changed in length of the rubber blank. Mixtures without ammonium carbamate show a significantly increased compression set and a lower Williams plasticity. The compression set and green strength are increased significantly by addition of ammonium carbamate.

What is claimed is:

1. A polyorganosiloxane rubber composition which hardens to an elastomer under the influence of heat, comprising;

(A) 100 parts by weight of a polyorganosiloxane of the formula

in which
- R is an identical or different, monohydric hydrocarbon radical having 1 to 18 carbon atoms per radical and are optionally substituted by a halogen atom or a cyano group,
- $R^1$ is an identical or different monovalent ethylenically unsaturated hydrocarbon radical having 2 to 6 carbon atoms per radical,
- m is an integer from 100 to 20,000
- n is 0 or an integer from 1 to 200 and
- x is 0 or 1, where the sum of x+n for polyorganosiloxanes of formula (1) is at least 1, (B) 20 to 200 parts by weight of filler, (C) substances which promote crosslinking, and (D) 0.01 to 1 part by weight of ammonium, alkali metal or alkaline earth metal carbamate.

2. A polyorganosiloxane rubber composition as claimed in claim 1, in which the polyorganosiloxane (A) has a viscosity of $0.1\times10^6$ to $100\times10^6$ mPa·s at 25° C.

3. A polyorganosiloxane rubber composition as claimed in claim 1, where (B) is a pyrogenically prepared silicic acid or precipitated silicic acid having a specific surface area (BET) of at least 50 $m^2/g$.

4. A polyorganosiloxane rubber composition as claimed in claim 1, wherein the substances (C) which promote crosslinking are crosslinking agents (C1) which form free radicals, organopolysiloxanes (C2) which contain Si-bonded hydrogen atoms, a transition metal hydrosilylation catalyst (C3), or mixtures thereof.

5. A polyorganosiloxane rubber composition as claimed in claim 1, wherein the carbamate (D) is ammonium carbamate.

6. A polyorganosiloxane rubber composition as claimed in claim 1, wherein 0.1 to 0.5 parts by weight of carbamate (D) is present per 100 parts by weight of polyorganosiloxane (A).

7. A polyorganosiloxane rubber composition as claimed in claim 1, further comprising a low-viscosity organosilicone compound (E) having a viscosity of 10 to 100 mPa·s at 25° C.

8. A process for the preparation of a polyorganosiloxane rubber composition as claimed in claim 1, wherein components (A), (B) and (D) are mixed, the mixture is then subjected to heat treatment and component (C) is added subsequent to the heat treatment.

* * * * *